US012437637B2

(12) United States Patent
Nagai et al.

(10) Patent No.: US 12,437,637 B2
(45) Date of Patent: Oct. 7, 2025

(54) INTERSECTION CONTROL SYSTEM, INTERSECTION CONTROL METHOD, AND COMPUTER READABLE MEDIUM

(71) Applicant: TOYOTA JIDOSHA KABUSHIKI KAISHA, Toyota (JP)

(72) Inventors: Manabu Nagai, Nagoya (JP); Suguru Watanabe, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 218 days.

(21) Appl. No.: 18/195,737

(22) Filed: May 10, 2023

(65) Prior Publication Data

US 2023/0368664 A1 Nov. 16, 2023

(30) Foreign Application Priority Data

May 13, 2022 (JP) ................................. 2022-079623

(51) Int. Cl.
*G08G 1/0967* (2006.01)
*G08G 1/01* (2006.01)
(Continued)

(52) U.S. Cl.
CPC ..... *G08G 1/096741* (2013.01); *G08G 1/0116* (2013.01); *G08G 1/0141* (2013.01);
(Continued)

(58) Field of Classification Search
CPC ........... G08G 1/096741; G08G 1/0116; G08G 1/0141; G08G 1/0145; G08G 1/056; G08G 1/096783; G08G 1/164; G08G 1/166
(Continued)

(56) References Cited

U.S. PATENT DOCUMENTS 8,892,356 B1 * 11/2014 Weiland ................ B60W 50/14 701/454
2017/0075824 A1 * 3/2017 Haen ....................... G06F 12/00
(Continued)

FOREIGN PATENT DOCUMENTS

JP 2011-159152 A 8/2011
JP 2022-138782 A 9/2022

*Primary Examiner* — Helal A Algahaim
*Assistant Examiner* — Patrick M Brady
(74) *Attorney, Agent, or Firm* — Dinsmore & Shohl LLP

(57) ABSTRACT

An intersection control apparatus includes a decision unit that decides first intersection control information, second intersection control information, and third intersection control information and a distribution unit that distributes the first intersection control information, the second intersection control information, and the third intersection control information to a plurality of vehicles scheduled to pass through the intersection in the recited order. The first intersection control information and the third intersection control information include a plurality of permitted track information pieces. The second intersection control information includes at least one permitted track information piece. The first intersection control information, the second intersection control information, and the third intersection control information are different from each other. The first intersection control information and the third intersection control information include the at least one permitted track information piece included in the second intersection control information.

9 Claims, 15 Drawing Sheets

(51) Int. Cl.
*G08G 1/056* (2006.01)
*G08G 1/16* (2006.01)

(52) U.S. Cl.
CPC ........... *G08G 1/0145* (2013.01); *G08G 1/056* (2013.01); *G08G 1/096783* (2013.01); *G08G 1/164* (2013.01); *G08G 1/166* (2013.01)

(58) Field of Classification Search
USPC .......................................................... 701/117
See application file for complete search history.

(56) References Cited

U.S. PATENT DOCUMENTS

2018/0099665 A1* 4/2018 You ....................... G01S 13/931
2019/0088120 A1* 3/2019 Adireddy ............... G08G 1/081
2019/0318620 A1* 10/2019 Yang .................... G08G 1/0133
2022/0292958 A1 9/2022 Nagai et al.

* cited by examiner

| CONTROL NO. | INTERSECTION CONTROL INFORMATION |
|---|---|
| 1 | 000 000 100 111 |
| 2 | 111 000 000 100 |
| 3 | 100 111 000 000 |
| 4 | 000 100 111 000 |
| 5 | 100 000 100 101 |
| 6 | 101 100 000 100 |
| 7 | 100 101 100 000 |
| 8 | 000 100 101 100 |
| 9 | 100 110 000 100 |
| 10 | 100 100 110 000 |
| 11 | 000 100 100 110 |
| 12 | 110 000 100 100 |
| 13 | 000 110 000 110 |
| 14 | 110 000 110 000 |
| 15 | 001 100 001 100 |
| 16 | 100 001 100 001 |
| 17 | 100 100 100 100 |

Fig. 4

| bit | |
|---|---|
| 1 | FROM NORTH AND TURN LEFT |
| 2 | FROM NORTH AND GO STRAIGHT |
| 3 | FROM NORTH AND GO TURN RIGHT |
| 4 | FROM EAST AND TURN LEFT |
| 5 | FROM EAST AND GO STRAIGHT |
| 6 | FROM EAST AND TURN RIGHT |
| 7 | FROM SOUTH AND TURN LEFT |
| 8 | FROM SOUTH AND GO STRAIGHT |
| 9 | FROM SOUTH AND TURN RIGHT |
| 10 | FROM WEST AND TURN LEFT |
| 11 | FROM WEST AND GO STRAIGHT |
| 12 | FROM WEST AND TURN RIGHT |

Fig. 5

| | |
|---|---|
| FIRST CONTROL INFORMATION | 000 000 100 111 |
| THIRD CONTROL INFORMATION | 100 100 100 100 |
| SECOND CONTROL INFORMATION | 000 000 100 100 |

Fig. 14

INTERSECTION CONTROL SYSTEM, INTERSECTION CONTROL METHOD, AND COMPUTER READABLE MEDIUM

CROSS REFERENCE TO RELATED APPLICATIONS

This application is based upon and claims the benefit of priority from Japanese patent application No. 2022-079623, filed on May 13, 2022, the disclosure of which is incorporated herein in its entirety by reference.

BACKGROUND

The present disclosure relates to an intersection control system, an intersection control method, and a program.

Japanese Unexamined Patent Application Publication No. 2011-159152 discloses a traffic signal control system that controls a plurality of traffic signal lights installed at an intersection. Specifically, a plurality of vehicle detectors are installed on each of a plurality of roads connected to an intersection, and a control pattern suitable for the control of the plurality of traffic signal lights is selected based on sensing signals output from the plurality of vehicle detectors.

SUMMARY

In the above configuration of Japanese Unexamined Patent Application Publication No. 2011-159152, when the control pattern is switched, it is necessary to provide a clearance interval period during which no vehicle is allowed to enter the intersection for a predetermined period of time in order to clear the intersection of the vehicles remaining therein. Therefore, the above configuration of Japanese Unexamined Patent Application Publication No. 2011-159152 could increase traffic volumes at intersections. However, such an increase in traffic volumes at intersections would increase the risk that a collision may occur between vehicles at these intersections.

An object of the present disclosure is to provide a technique for increasing traffic volumes at intersections without increasing a risk that a collision may occur between vehicles at these intersections.

According to a first aspect of the present disclosure, an intersection control system for controlling entries of vehicles into an intersection including: a decision unit configured to decide first intersection control information, second intersection control information, and third intersection control information; and a distribution unit configured to distribute the first intersection control information, the second intersection control information, and the third intersection control information to a plurality of vehicles scheduled to pass through the intersection in the recited order. The first intersection control information and the third intersection control information include a plurality of permitted track information pieces, the second intersection control information includes at least one permitted track information piece, the first intersection control information, the second intersection control information, and the third intersection control information are different from each other, each of the permitted track information pieces indicates a permitted travel track of the vehicles when the vehicles pass through the intersection, and the first intersection control information and the third intersection control information include the at least one permitted track information piece included in the second intersection control information. According to the above configuration, by interposing the second intersection control information when the intersection control information to be distributed to the plurality of vehicles scheduled to pass through the intersection from the first intersection control information to the third intersection control information, it is not necessary to provide a clearance interval period for clearing the intersection of the vehicles remaining therein by prohibiting entries of vehicles into the intersection at all for a predetermined period of time, so that a traffic volume at the intersection can be increased without increasing a risk that a collision may occur between the vehicles at the intersection.

The decision unit may acquire travel track information indicating travel tracks of the plurality of vehicles scheduled to pass through the intersection when the vehicles pass through the intersection, decide the first intersection control information and the third intersection control information based on the travel track information about the plurality of vehicles, and decide the second intersection control information based on the first intersection control information and the third intersection control information.

The intersection control system may further include a storage unit configured to store a plurality of intersection control information pieces different from each other. The decision unit may decide the first intersection control information and the third intersection control information by selecting the first intersection control information and the third intersection control information from the plurality of intersection control information pieces stored in the storage unit based on the travel track information about the plurality of vehicles.

When each of the intersection control information pieces is composed of a bit array, the bit array including a bit corresponding to the permitted travel track as a first value and a bit corresponding to another travel track as a second value different from the first value, the decision unit may generate the bit array of the second intersection control information by performing a bitwise operation on the bit array of the first intersection control information and the bit array of the third intersection control information.

The at least one permitted track information piece of the second intersection control information may include the plurality of the permitted track information pieces, and the first intersection control information and the third intersection control information may include all of the plurality of permitted track information pieces included in the second intersection control information.

The travel tracks of the plurality of permitted track information pieces of the first intersection control information may not interfere with each other. The travel tracks of the plurality of permitted track information pieces of the third intersection control information may not interfere with each other.

A first period and a third period may be longer than a second period. The first intersection control information is provided for control at the intersection in the first period, the third intersection control information is provided for control at the intersection in the third period, and the second intersection control information is provided for control at the intersection in the second period.

According to a second example aspect of the present disclosure, an intersection control method for controlling entries of vehicles into an intersection including: deciding first intersection control information, second intersection control information, and third intersection control information; and distributing the first intersection control information, the second intersection control information, and the third intersection control information to a plurality of vehicles scheduled to pass through the intersection in the recited order. The first intersection control information and the third intersection control information include a plurality of permitted track information pieces, the second intersection control information includes at least one permitted track information piece, the first intersection control information, the second intersection control information, and the third intersection control information are different from each other, each of the permitted track information pieces indicates a permitted travel track of the vehicles when the vehicles pass through the intersection, and the first intersection control information and the third intersection control information include the at least one permitted track information piece included in the second intersection control information.

A program for causing a computer to execute the above intersection control method is provided.

According to the present disclosure, it is possible to increase traffic volumes at intersections without increasing a risk that a collision may occur between vehicles at intersections.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 4 shows bit arrays of intersection control information;

FIG. 5 is a diagram for explaining each bit in the bit array of the intersection control information;

FIG. 14 shows the bit arrays of the first, second, and third control information.

DESCRIPTION OF EMBODIMENTS

Figure 1:
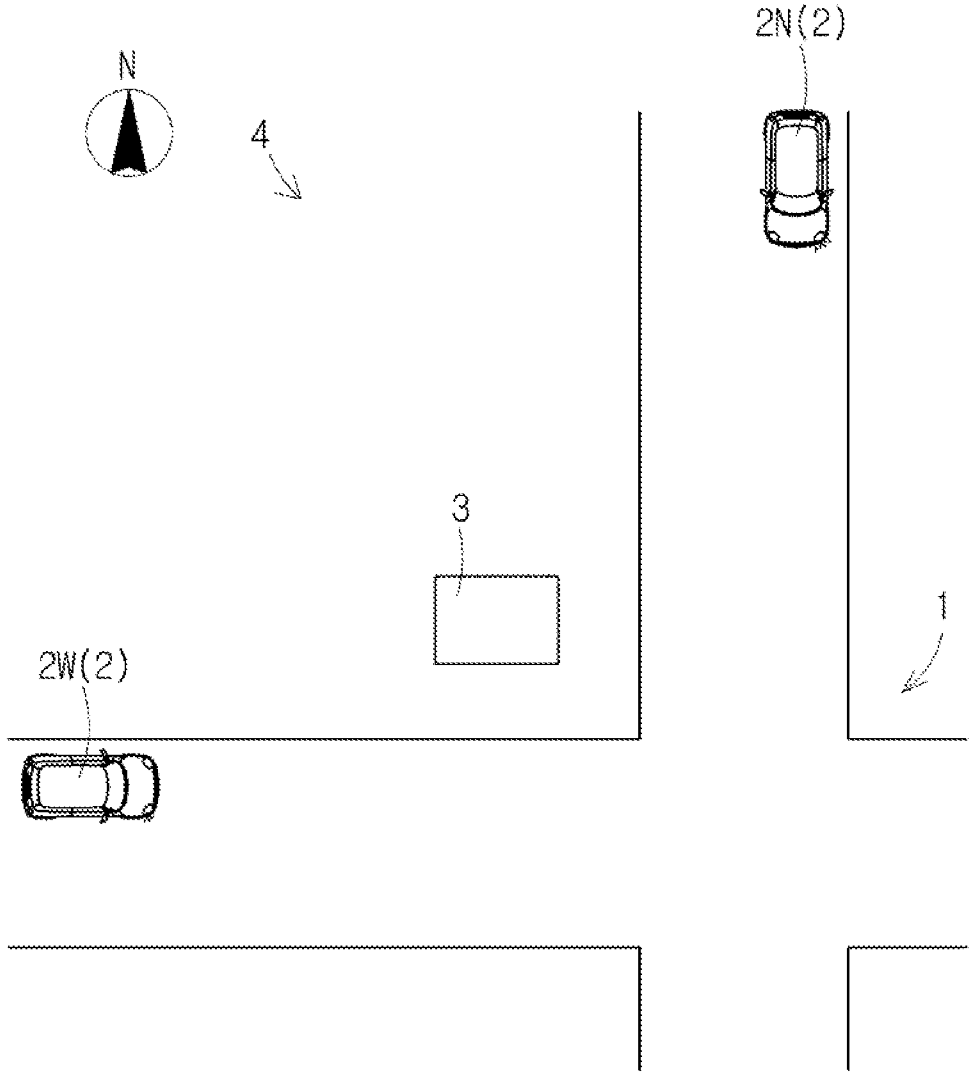
FIG. 1 is a plan view showing a plurality of vehicles approaching an intersection.

An embodiment of the present disclosure is described below with reference to the drawings. FIG. 1 shows a plurality of vehicles 2 traveling toward an intersection 1. That is, in FIG. 1, the plurality of vehicles 2 are approaching the intersection 1 in the vicinity of the intersection 1. In other words, the plurality of vehicles 2 are scheduled to pass through the intersection 1. Hereinafter, for convenience of explanation, the vehicle 2 traveling south and approaching the intersection 1 is also referred to as a vehicle 2N. Similarly, the vehicle 2 traveling east and approaching the intersection 1 is also referred to as a vehicle 2W. For convenience of explanation, the vehicle 2N shall make a left turn at the intersection 1 and the vehicle 2W shall make a right turn at the intersection 1. Each of the plurality of vehicles 2 travels under automatic driving control. Alternatively, each of the plurality of vehicles 2 may be driven by an occupant. As shown in FIG. 1, an intersection control apparatus 3 is provided in the vicinity of the intersection 1.

The intersection control apparatus 3 is a specific example of an intersection control system. A traffic system 4 includes the intersection control apparatus 3 and the plurality of vehicles 2 in the vicinity of the intersection 1. The intersection control apparatus 3 may be implemented by a single apparatus or by distributed processing using a plurality of apparatuses.

The intersection control apparatus 3 and the plurality of vehicles 2 are configured to be capable of two-way communication by, for example, wireless communication technology such as Wi-Fi (registered trademark) and Bluetooth (registered trademark) or via the Internet.

Figure 2:
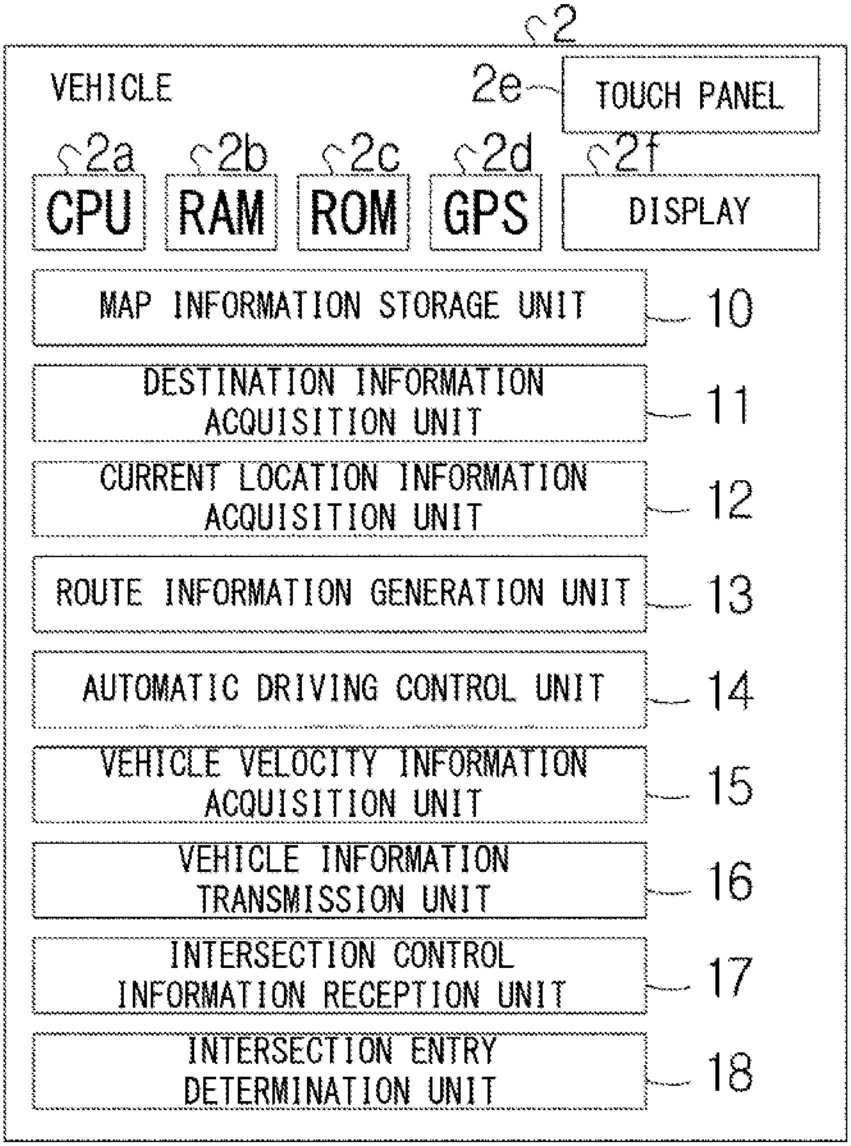
FIG. 2 is a functional block diagram of a vehicle.

FIG. 2 shows a functional block diagram of the vehicle 2. As shown in FIG. 2, the vehicle 2 includes a CPU 2*a* (Central Processing Unit), a RAM 2*b* (Random Access Memory) that can be freely read and written, and a ROM 2*c* (Read Only Memory). The vehicle 2 further include a GPS module 2*d* (Global Positioning System), a touch panel 2*e*, and a display 2*f*. The touch panel 2*e* and the display 2*f* are typically stacked on each other and integrated. The CPU 2*a* reads and executes a control program stored in the ROM 2*c*, and the control program causes hardware such as the CPU 2*a* to function as various functional units.

The various functional units include a map information storage unit 10, a destination information acquisition unit 11, a current location information acquisition unit 12, a route information generation unit 13, an automatic driving control unit 14, a vehicle velocity information acquisition unit 15, a vehicle information transmission unit 16, an intersection control information reception unit 17, and an intersection entry determination unit 18.

The map information storage unit 10 stores map information. The map information typically includes node information representing feature points of roads and link information for connecting the two nodes to express shapes of the roads. The feature points of the roads include intersections.

The destination information acquisition unit 11 acquires destination information input through the touch panel 2*e*.

The current location information acquisition unit 12 acquires current location information about the vehicles 2 using the GPS module 2*d*. The GPS module 2*d* is a specific example of a GNSS module (Global Navigation Satellite System). Specific examples of the GNSS modules include a GLONASS module (Global Navigation Satellite System), a Galileo module, a BeiDou module, and a QZSS module (Quasi-Zenith Satellite System). The current location information acquisition unit 12 may estimate and acquire the current location information about the vehicle 2 based on signal intensity of a signal received from a radio base station or a beacon emitted from the radio base station.

The route information generation unit 13 refers to the map information stored in the map information storage unit 10 and generates route information from the current location to the destination based on the destination information acquired by the destination information acquisition unit 11 and the current location information acquired by the current location information acquisition unit 12.

The route information includes a plurality of travel track information pieces. The plurality of travel track information pieces correspond one-to-one to a plurality of the intersections through which the vehicles 2 pass.

Each piece of travel track information indicates a travel track of the vehicle 2 when the vehicle 2 passes through the corresponding intersection. Each piece of travel track information typically includes pre-passage direction identification information indicating a direction in which the vehicle 2 travels before passing through the intersection and post-passage direction identification information indicating a direction in which the vehicle 2 travels after passing through the intersection. For example, since the vehicle 2N shown in FIG. 1 makes a left turn at the intersection 1, the pre-passage direction identification information in the travel track information corresponding to the intersection 1 is "south" and the post-passage direction identification information corresponding to the intersection 1 is "east."

Alternatively, each piece of the travel track information may include pre-passage road identification information indicating a road on which the vehicles 2 travel before passing through the intersection 1 and post-passage road identification information indicating a road on which the vehicles 2 travel after passing through the intersection 1. For example, since the vehicle 2N in FIG. 1 makes a left turn at the intersection 1, if a road ID of the road extending northward from the intersection 1 is "No. 1234" and a road ID of the road extending eastward from the intersection 1 is "No. 2345", the post-passage road identification information in the travel track information corresponding to the intersection 1 will be "1234" and the post-passage road identification information corresponding to the intersection 1 will be "2345".

The automatic driving control unit 14 controls the vehicles 2 to travel according to the route information generated by the route information generation unit 13.

The vehicle velocity information acquisition unit 15 acquires vehicle velocity information about the vehicles 2 based on detection signals from a vehicle velocity sensor which detects vehicle velocities of the vehicles 2.

The vehicle information transmission unit 16 transmits the vehicle information to the intersection control apparatus 3 at predetermined intervals. The vehicle information includes the current location information acquired by the current location information acquisition unit 12 and the vehicle velocity information acquired by the vehicle velocity information acquisition unit 15. The predetermined interval is, for example, but not limited to 1 second. The vehicle information further includes the travel track information corresponding to the intersection 1 that the vehicle is currently approaching.

The intersection control information reception unit 17 receives intersection control information from the intersection control apparatus 3. The intersection control information indicates a permitted travel track of the vehicle 2 at the intersection 1, like a traffic signal light installed at the intersection 1. Details of the intersection control information will be described later.

The intersection entry determination unit 18 determines whether or not to permit an entry into the intersection 1 based on the intersection control information received by the intersection control information reception unit 17. The automatic driving control unit 14 makes the vehicle 2 enter the intersection 1 or makes the vehicle 2 wait before the intersection 1 based on the determination result by the intersection entry determination unit 18.

Figure 3:
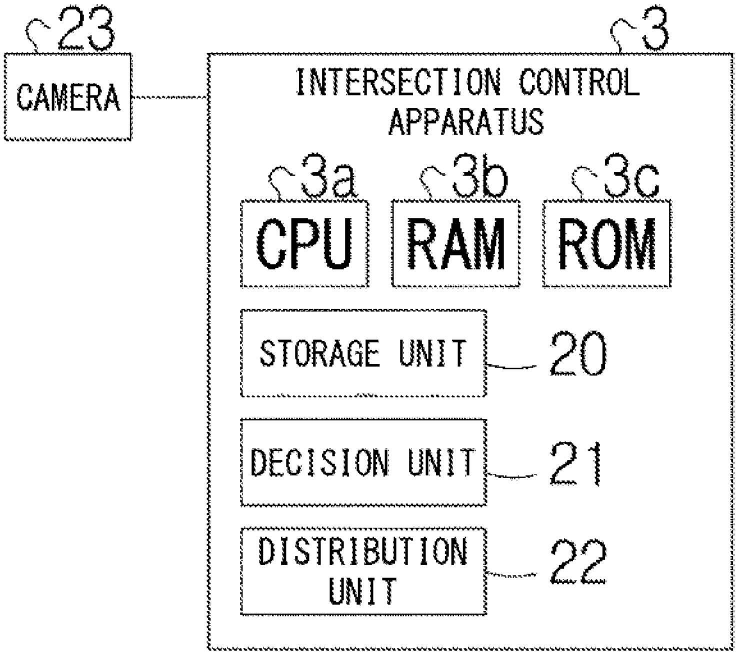
FIG. 3 is a functional block diagram of an intersection control apparatus.

FIG. 3 shows is a functional block diagram of the intersection control apparatus 3. As shown in FIG. 3, the intersection control apparatus 3 includes a CPU 3*a* (Central Processing Unit), a RAM 3*b* (Random Access Memory) that can be freely read and written, and a ROM 3*c* (Read Only Memory). The intersection 1, the vehicles 2 in the vicinity of the intersection 1, and a camera 23 for capturing images of pedestrians crossing the road in the vicinity of the intersection 1 are connected to the intersection control apparatus 3. When the CPU 3*a* reads and executes the control program stored in the ROM 3*c*, the control program makes hardware such as the CPU 3*a* function as a storage unit 20, a decision unit 21, and a distribution unit 22.

The storage unit 20 stores the plurality of intersection control information pieces different from each other. Each of the intersection control information pieces includes a plurality of permitted track information pieces different from each other. Each permitted track information piece indicates a permitted travel track of the vehicle 2 when the vehicle 2 passes the intersection 1. The plurality of permitted travel tracks of each intersection control information piece are configured not to interfere with each other. Here, "not to interfere with each other" means "not to merge with each other" and "not to cross each other".

FIG. 4 shows the plurality of intersection control information pieces stored in the storage unit 20. That is, FIG. 4 shows the plurality of intersection control information pieces identified by a control No. 1 to a control No. 17.

In this embodiment, each intersection control information piece is composed of a 12 bit array. Then, each permitted track information piece is composed of an index of a bit array constituting the intersection control information piece and its value. FIG. 5 shows the travel track of each bit of the bit array of the intersection control information. As shown in FIGS. 4 and 5, a value of "1" for the first bit (index=1) of the intersection control information means that a travel track in which a vehicle enters the intersection 1 from the north and turns left at the intersection 1 is permitted. On the other hand, a value of "0" for the first bit (index=1) of the intersection control information means that a travel track in which a vehicle enters the intersection 1 from the north and turns left at the intersection 1 is prohibited. The same applies to the second and subsequent bits of the intersection control information. Each intersection control information piece may include intersection identification information identifying the intersection 1. Each intersection control information piece may include effective time information indicating a start time at which the intersection control information becomes effective and an end time. Each intersection control information piece may include permitted vehicle identification information identifying the type of vehicle permitted to pass through the intersection 1.

Figure 6:
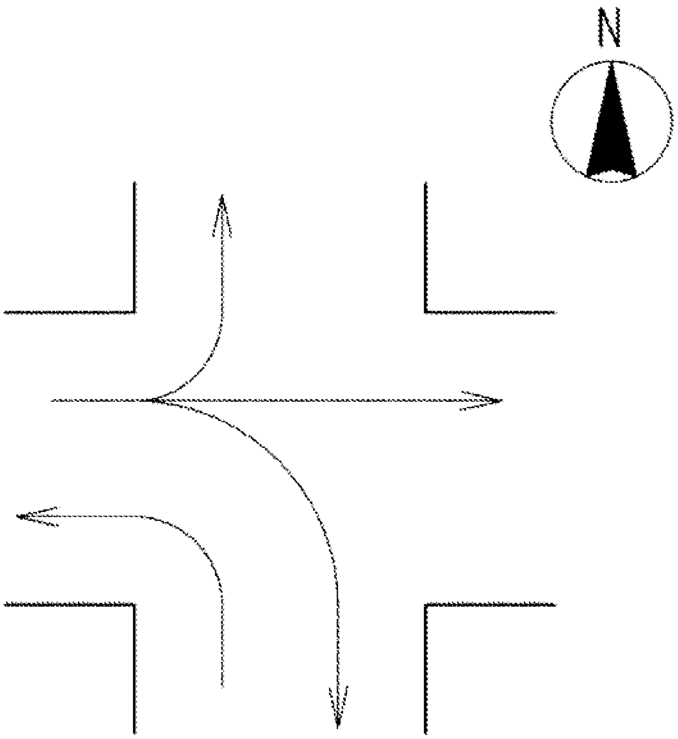
FIG. 6 shows visualization of the intersection control information of a control No. 1.

Returning to FIG. 4, in the intersection control information of the control No. 1, the 7th, 10th, 11th, and 12th bits are "1" and other bits are "0". Therefore, the intersection control information of the control No. 1 permits a "travel track in which a vehicle enters the intersection 1 from the south and turns left at the intersection 1", a "travel track in which a vehicle enters the intersection 1 from the west and turns left", a "travel track in which a vehicle enters the intersection 1 and goes straight", and a "travel track in which a vehicle enters the intersection 1 from the west and turns right" as shown in FIG. 6. As shown in FIG. 6, the four travel tracks permitted by the intersection control information of the control No. 1 do not interfere with each other. Therefore, as long as vehicles travel according to the intersection control information of the control No. 1, they do not collide with each other while passing through the intersection 1.

Figure 7:
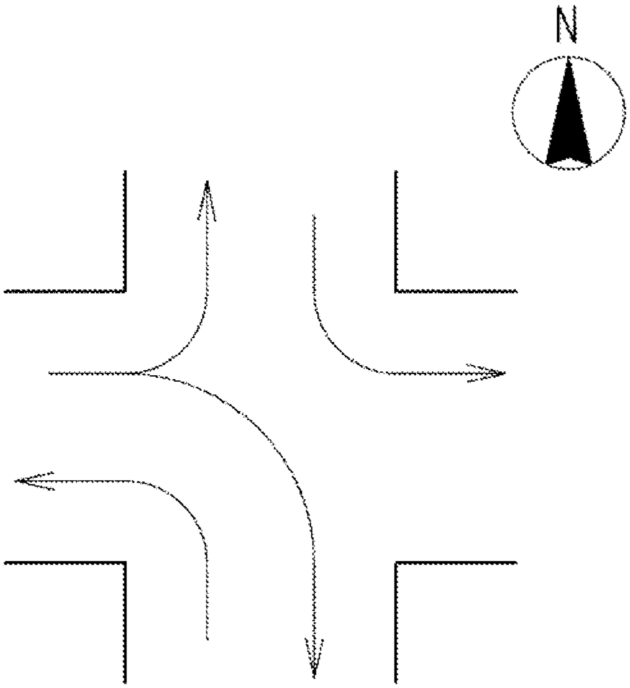
FIG. 7 shows visualization of the intersection control information of a control No. 5.

Returning to FIG. 4, in the intersection control information of the control No. 5, the 1st, 7th, 10th, and 12th bits are "1" and other bits are "0". Therefore, the intersection control information of the control No. 5 permits a "travel track in which a vehicle enters the intersection 1 from the north and turns left at the intersection 1", a "travel track in which a vehicle enters the intersection 1 from the south and turns left", a "travel track in which a vehicle enters the intersection 1 from the west and turns left", and a "travel track in which a vehicle enters the intersection 1 from the west and turns right" as shown in FIG. 7. As shown in FIG. 7, the four travel tracks permitted by the intersection control information of the control No. 5 do not interfere with each other. Therefore, as long as vehicles travel according to the intersection control information of the control No. 5, they do not collide with each other while passing through the intersection 1.

Figure 8:
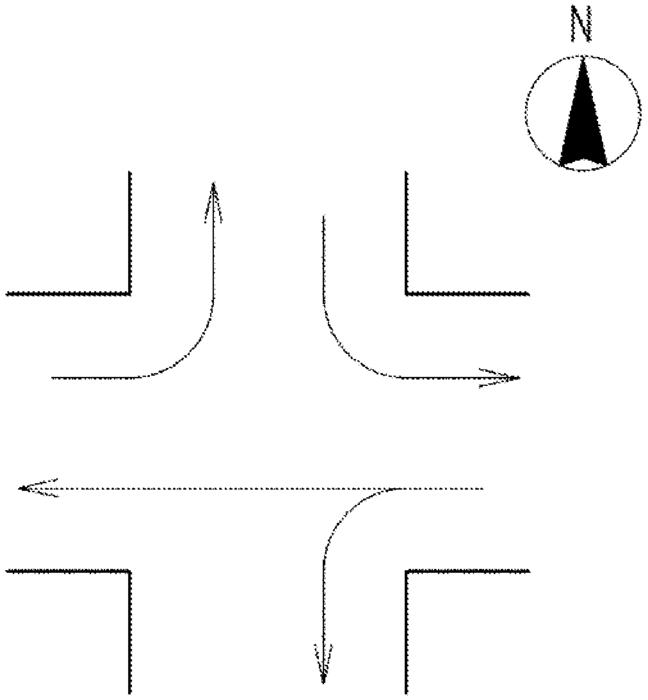
FIG. 8 shows visualization of the intersection control information of a control No. 9.

Returning to FIG. 4, in the intersection control information of the control No. 9, the 1st, 4th, 5th, and 10th bits are "1" and other bits are "0". Therefore, the intersection control information of the control No. 9 permits a "travel track in which a vehicle enters the intersection 1 from the north and turns left at the intersection 1", a "travel track in which a vehicle enters the intersection 1 from the east and turns left", a "travel track in which a vehicle enters the intersection 1 from the east and goes straight", and a "travel track in which a vehicle enters the intersection 1 from the west and turns left" as shown in FIG. 8. As shown in FIG. 8, the four travel tracks permitted by the intersection control information of the control No. 9 do not interfere with each other. Therefore, as long as vehicles travel according to the intersection control information of the control No. 9, they do not collide with each other while passing through the intersection 1.

Figure 9:
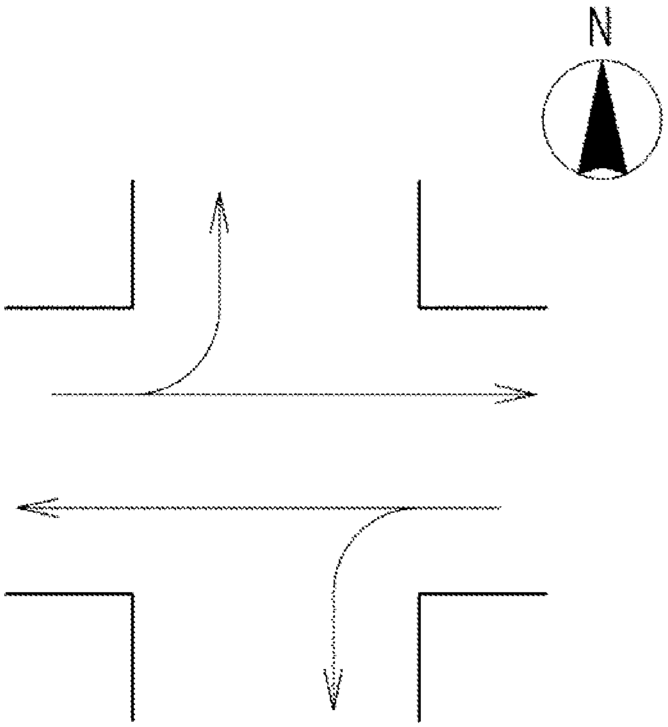
FIG. 9 shows visualization of the intersection control information of a control No. 13.

Returning to FIG. 4, in the intersection control information of the control No. 13, the 4th, 5th, 10th, and 11th bits are "1" and other bits are "0". Therefore, the intersection control information of the control No. 13 permits a "travel track in which a vehicle enters the intersection 1 from the east and turns left at the intersection 1", a "travel track in which a vehicle enters the intersection 1 from the east and goes straight through the intersection 1", a "travel track in which a vehicle enters the intersection 1 from the west and turns left", and a "travel track in which a vehicle enters the intersection 1 from the west and goes straight" as shown in FIG. 9. As shown in FIG. 9, the four travel tracks permitted by the intersection control information of the control No. 13 do not interfere with each other. Therefore, as long as vehicles travel according to the intersection control information of the control No. 13, they do not collide with each other while passing through the intersection 1.

Figure 10:
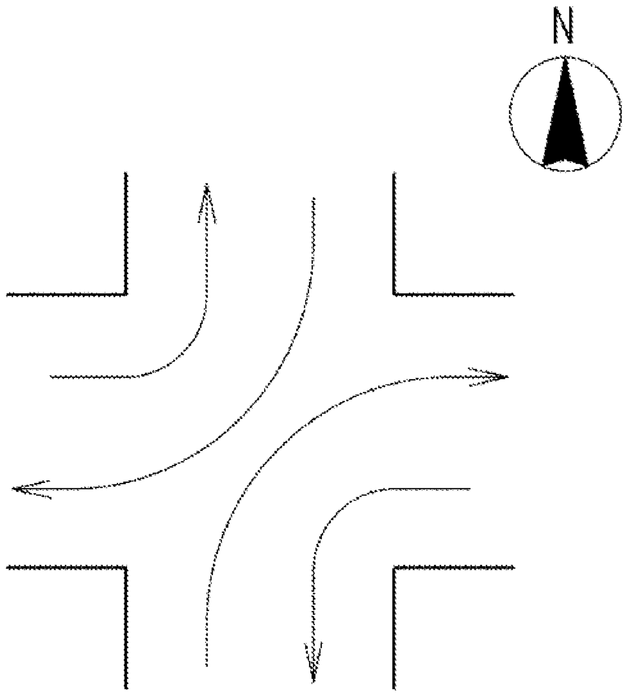
FIG. 10 shows visualization of the intersection control information of a control No. 15.

Returning to FIG. 4, in the intersection control information of the control No. 15, the 3rd, 4th, 9th, and 10th bits are "1" and other bits are "0". Therefore, the intersection control information of the control No. 15 permits a "travel track in which a vehicle enters the intersection 1 from the north and turns right at the intersection 1", a "travel track in which a vehicle enters the intersection 1 from the east and turns left", a "travel track in which a vehicle enters the intersection 1 from the south and turns right", and a "travel track in which a vehicle enters the intersection 1 from the west and turns left" as shown in FIG. 10. As shown in FIG. 10, the four travel tracks permitted by the intersection control information of the control No. 15 do not interfere with each other. Therefore, as long as vehicles travel according to the intersection control information of the control No. 15, they do not collide with each other while passing through the intersection 1.

Figure 11:
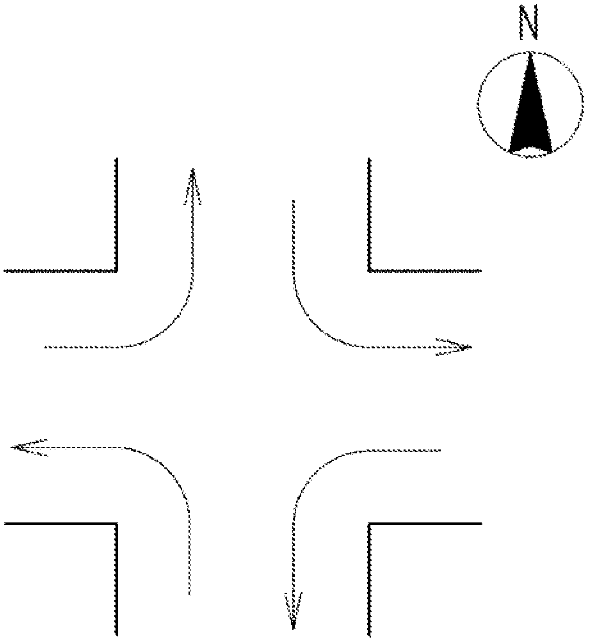
FIG. 11 shows visualization of the intersection control information of a control No. 17.
Figure 12:
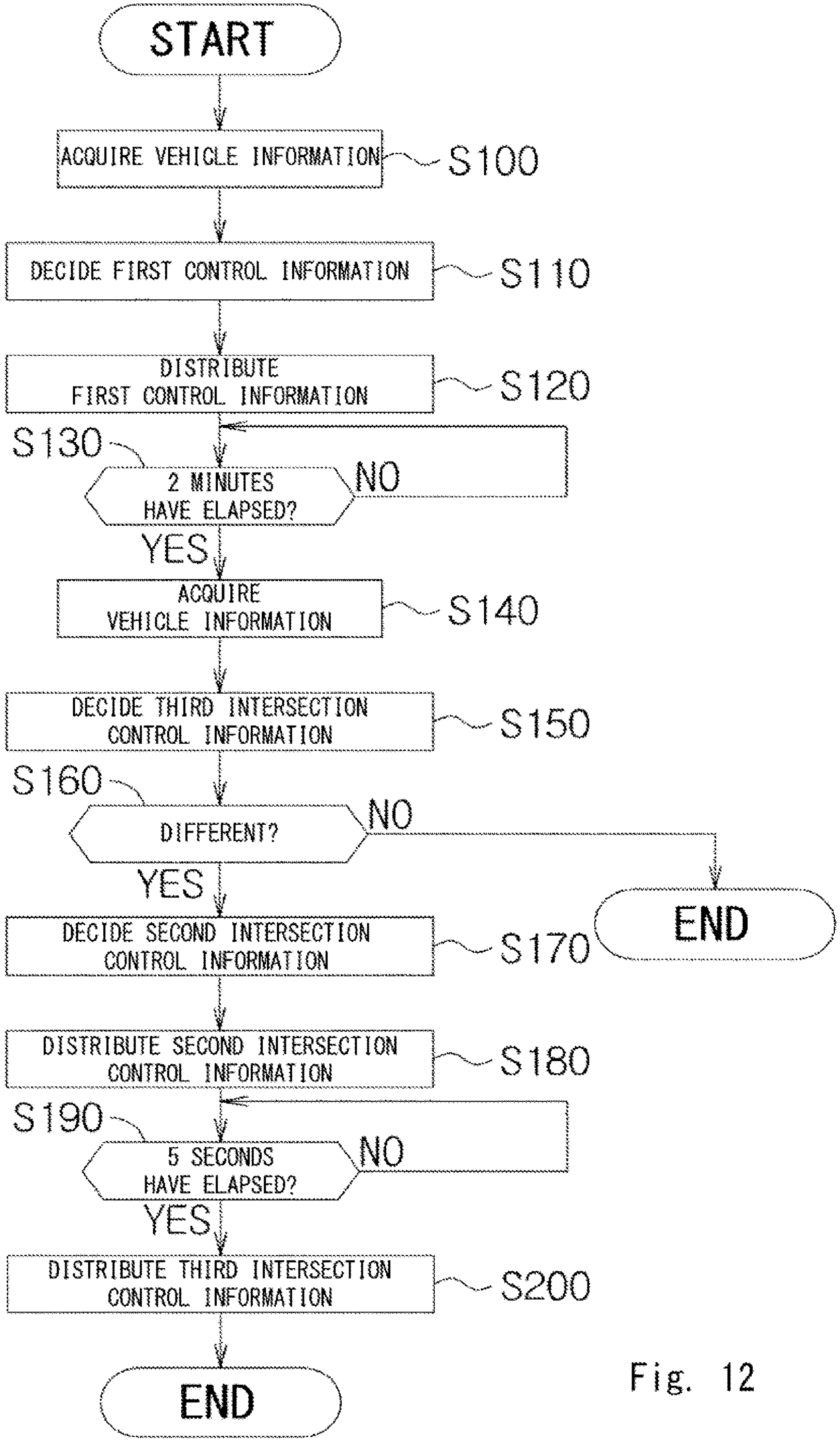
FIG. 12 shows a control flow of the intersection control apparatus.

Returning to FIG. 4, in the intersection control information of the control No. 17, the 1st, 4th, 7th, and 10th bits are "1" and other bits are "0". Therefore, the intersection control information of the control No. 17 permits a "travel track in which a vehicle enters the intersection 1 from the north and turns left at the intersection 1", a "travel track in which a vehicle enters the intersection 1 from the east and turns left at the intersection 1", a "travel track in which a vehicle enters the intersection 1 from the south and turns left at the intersection 1", and a "travel track in which a vehicle enters the intersection 1 from the west and turns left at the intersection 1" as shown in FIG. 11. As shown in FIG. 11, the four travel tracks permitted by the intersection control information of the control No. 17 do not interfere with each other. Therefore, as long as vehicles travel according to the intersection control information of the control No. 17, they do not collide with each other while passing through the intersection 1.

Returning to FIG. 3, the decision unit 21 decides the intersection control information to be used for the control of the intersection 1. Specifically, the decision unit 21 decides first intersection control information, second intersection control information, and third intersection control information. The first intersection control information, the second intersection control information, and the third intersection control information are intersection control information different from each other. Hereinafter, the first intersection control information is also referred to simply as the first control information. The same applies to the second intersection control information and the third intersection control information.

The distribution unit 22 distributes the first intersection control information, the second intersection control information, and the third intersection control information to the plurality of vehicles 2 scheduled to pass through the intersection 1 in the recited order.

Next, an operation of the intersection control apparatus 3 is described with reference to FIGS. 12 to 15.

S100:

First, the decision unit 21 acquires the vehicle information from the plurality of vehicles 2 scheduled to pass through the intersection 1. The decision unit 21 may acquire the vehicle information only from vehicles 2 in the vicinity of the intersection 1 among the plurality of vehicles 2 scheduled to pass through the intersection 1. The vicinity of the intersection 1 is typically a range of several hundred meters from the intersection 1. The vicinity of the intersection 1 may be defined based on a velocity limit set for each road connecting to the intersection 1.

S110:

Next, the decision unit 21 decides the first intersection control information based on the vehicle information acquired from the plurality of vehicles 2 scheduled to pass through the intersection 1. Specifically, the decision unit 21 estimates when each vehicle 2 will reach the intersection 1 based on the current location and vehicle velocity of each of the plurality of vehicles 2 scheduled to pass through the intersection 1, and classifies the plurality of vehicles 2 into a plurality of groups according to an arrival time. Next, the decision unit 21 decides the first intersection control information so that the plurality of vehicles 2 belonging to the group with the earliest arrival time among the plurality of groups can pass through the intersection 1.

At this time, the decision unit 21 may generate the first intersection control information each time, select the most suitable intersection control information from the plurality of intersection control information pieces stored in the storage unit 20, and decide the first intersection control information with the selected intersection control information. In the latter case, the decision unit 21 may select the intersection control information that allows more vehicles 2 belonging to the above group to pass through the intersection 1 among the plurality of intersection control information pieces stored in the storage unit 20.

The decision method by which the decision unit 21 decides the first intersection control information based on the vehicle information acquired from the plurality of vehicles 2 scheduled to pass through the intersection 1 is not limited to the above method. For example, a learning model may be learned using reinforcement learning, which is configured in such a way that the higher the traffic volume at the intersection 1, the higher the reward to be received, and the decision unit 21 may decide the first intersection control information using the learned learning model.

S120:

Next, the distribution unit 22 distributes the first intersection control information decided by the decision unit 21 to the plurality of vehicles 2 scheduled to pass through the intersection 1. The plurality of vehicles 2 scheduled to pass through the intersection 1 pass through the intersection 1 or wait before the intersection 1 based on the received first intersection control information.

S130:

Next, the decision unit 21 determines whether a predetermined period of time has elapsed since the first intersection control information is distributed. The predetermined period of time is typically, but not limited to, 2 minutes. When it is determined that the predetermined period of time has not elapsed (S130: NO), the decision unit 21 repeats S130. On the other hand, when it is determined that the predetermined period of time has elapsed (S130: YES), the decision unit 21 proceeds the processing to S140.

S140:

Next, the decision unit 21 acquires the vehicle information from the plurality of vehicles 2 scheduled to pass through the intersection 1.

S150:

Next, the decision unit 21 decides the third intersection control information based on the vehicle information acquired from the plurality of vehicles 2 scheduled to pass through the intersection 1. The method of determining the third intersection control information performed by the decision unit 21 may be the same as or different from the method of determining the first intersection control information performed by the decision unit 21.

S160:

Next, the decision unit 21 determines whether the first intersection control information is different from the third intersection control information. When the first intersection control information and the third intersection control information are identical (S160: NO), the decision unit 21 ends the processing. On the other hand, when the first intersection control information is different from the third intersection control information (S160: YES), the decision unit 21 proceeds the processing to S170.

S170:

Next, the decision unit 21 decides the second intersection control information based on the first intersection control information and the third intersection control information. Specifically, the decision unit 21 decides the second intersection control information so that the first intersection control information and the third intersection control information have a relationship including at least one permitted track information piece included in the second intersection control information. In other words, the decision unit 21 compares the plurality of travel tracks permitted by the first intersection control information with the plurality of travel tracks permitted by the third intersection control information, and when at least one travel track is common, it generates the second intersection control information permitting the at least one travel track. When a plurality of travel tracks are common, the decision unit 21 generates the second intersection control information permitting the plurality of travel tracks. When the plurality of travel tracks are common, the decision unit 21 may generate the second intersection control information permitting any one or more travel tracks among the plurality of travel tracks. In both cases, the above relationship holds.

Figure 13:
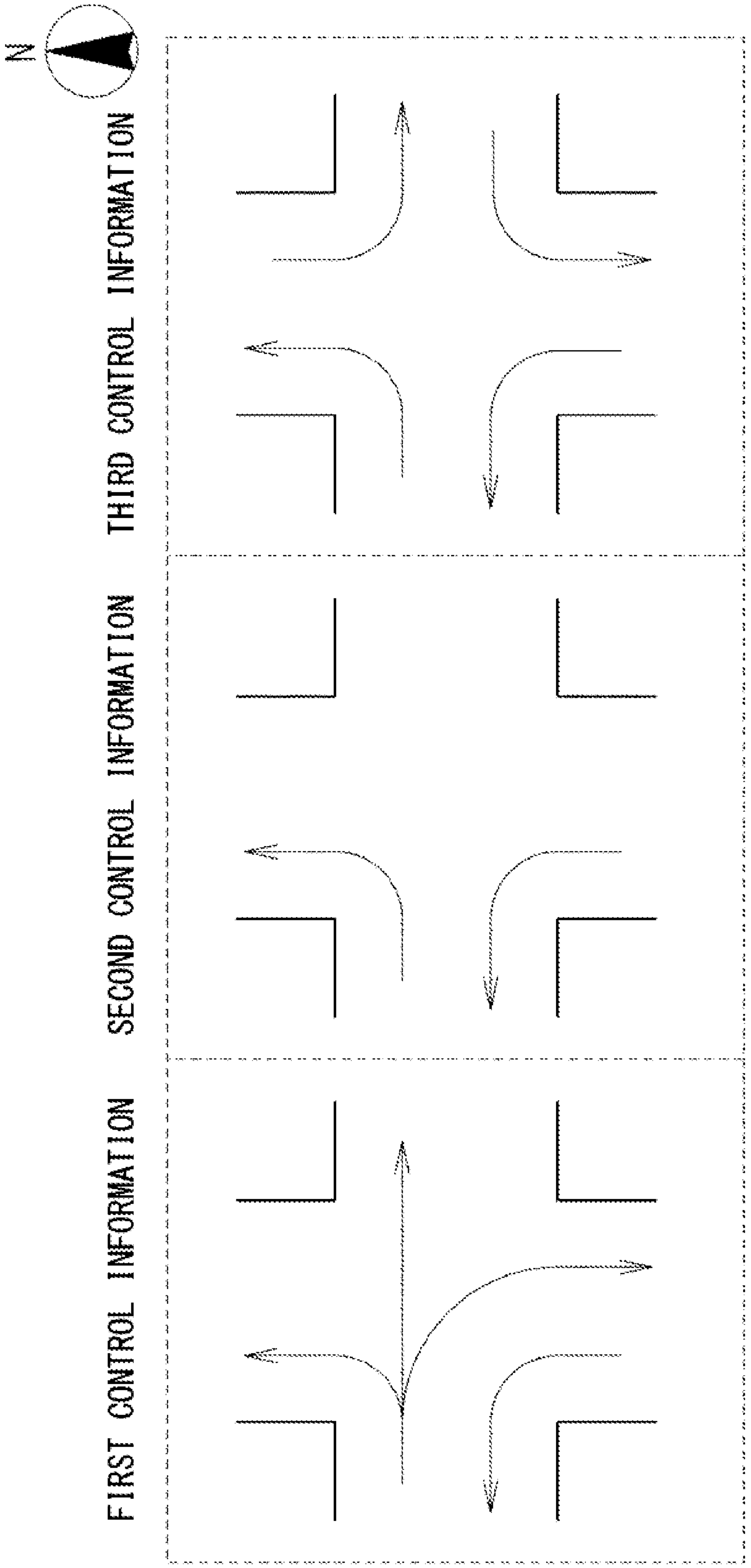
FIG. 13 shows visualization of first, second, and third control information.

FIG. 13 shows the travel tracks permitted by the first intersection control information and the travel tracks permitted by the third intersection control information. As shown in FIG. 13, both the first and third intersection control information permit the travel track in which a vehicle enters the intersection 1 from the west and turns left at intersection 1, and the travel track in which a vehicle enters the intersection 1 from the south and turns left at the intersection 1. Therefore, in this case, the second intersection control information is configured to permit the travel track in which a vehicle enters the intersection 1 from the west and turns left at the intersection 1, and the travel track in which a vehicle enters the intersection 1 from the south and turns left at the intersection 1. This establishes a relationship that the first and third intersection control information includes at least one permitted track information piece that is included in the second intersection control information. This further establishes a relationship that the first and third intersection control information includes a plurality of permitted track information pieces that are included in the second intersection control information.

FIG. 14 shows the bit arrays of the first and third intersection control information. When each of the first and third intersection control information is composed of a bit array as shown in FIG. 14, the decision unit 21 may generate a bit array of the second intersection control information by performing a bitwise operation on the bit array of the first intersection control information and the bit array of the third intersection control information, thereby deciding the second intersection control information.

In the bit array constituting the intersection control information in this embodiment, as described above, the bit corresponding to the permitted travel track is set to "1" and the bit corresponding to the other travel tracks is set to "0". In this case, the decision unit 21 generates the bit array of the second intersection control information by obtaining a logical AND of the bit array of the first intersection control information and the bit array of the third intersection control information, and thereby decides the second intersection control information.

On the other hand, in the bit array constituting the intersection control information, the bit corresponding to the permitted travel track may be set to "0" and the bit corresponding to the other travel tracks may be set to "1". In this case, the decision unit 21 inverts the bit array of the first intersection control information and the bit array of the third intersection control information, obtains a logical AND of the two bit arrays, and generates the bit array of the second intersection control information by inverting the obtained bit array, thereby deciding the second intersection control information.

S180:

Returning to FIG. 12, next, the distribution unit 22 distributes the second intersection control information decided by the decision unit 21 to the plurality of vehicles 2 scheduled to pass through the intersection 1. The plurality of vehicles 2 scheduled to pass through the intersection 1 pass through the intersection 1 or wait before the intersection 1 based on the received second intersection control information.

S190:

Next, the distribution unit 22 determines whether a predetermined period of time has elapsed since the second intersection control information is distributed. The predetermined period of time is typically, but is not limited to, 5 seconds. When it is determined that the predetermined period of time has not elapsed (S190: NO), the decision unit 21 repeats S190. On the other hand, when it is determined that the predetermined period of time has elapsed (S190: YES), the decision unit 21 proceeds the processing to S200.

S200:

Next, the distribution unit 22 distributes the third intersection control information decided by the decision unit 21 to the plurality of vehicles 2 scheduled to pass through the intersection 1. The plurality of vehicles 2 scheduled to pass through the intersection 1 pass through the intersection 1 or wait before the intersection 1 based on the received third intersection control information.

Figure 15:
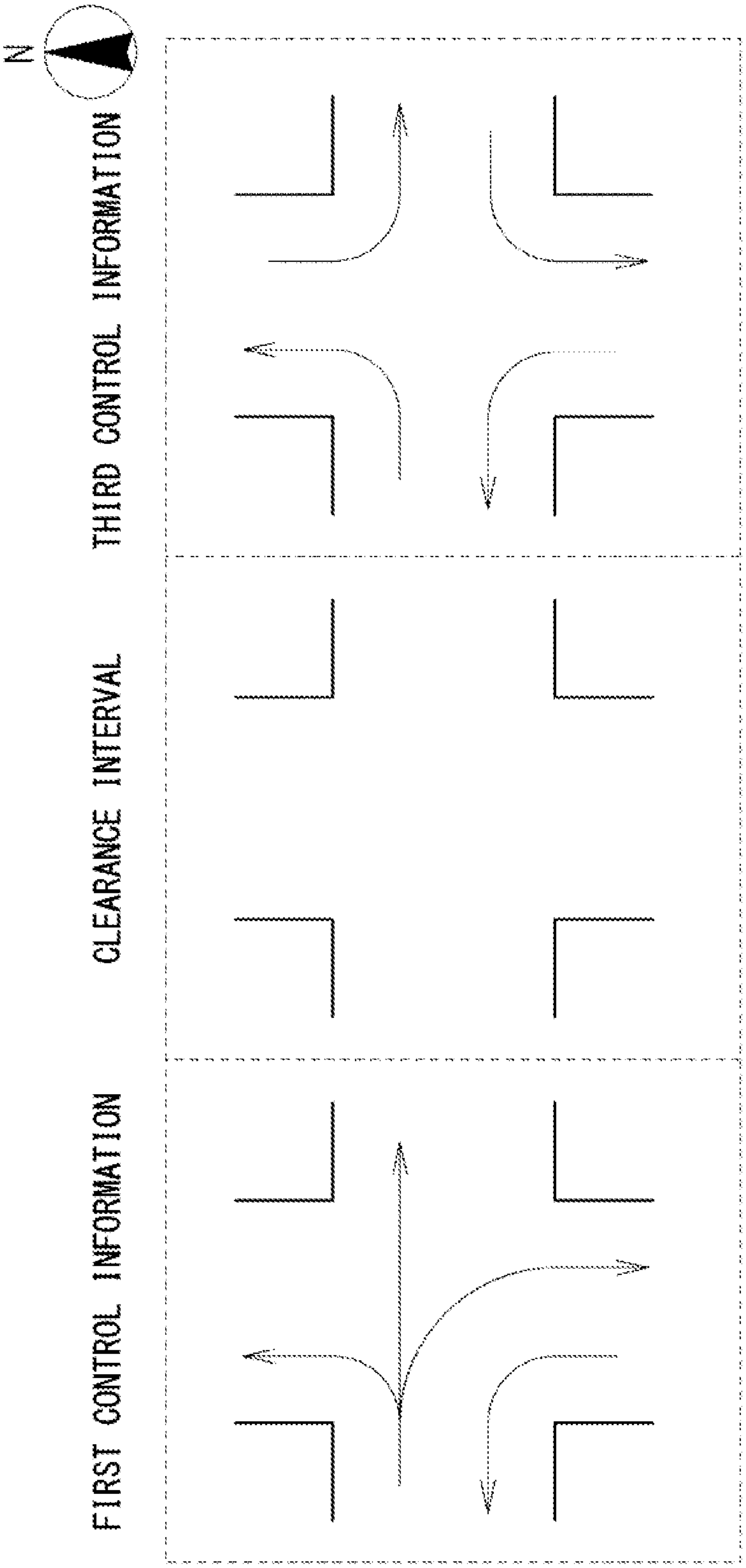
FIG. 15 shows a comparative example and visualization of the first control information, a clearance interval period, and the third control information.

Next, referring to FIGS. 13 and 15, the technical significance of distributing the second intersection control information between the distribution of the first intersection control information and the distribution of the third intersection control information is described. FIG. 15 shows a comparative example in which, instead of distributing the second intersection control information, a clearance interval period is provided between the distribution of the first intersection control information and the distribution of the third intersection control information. As shown in FIG. 15, when the first intersection control information is different from the third intersection control information, a clearance interval period is provided between the distribution of the first intersection control information and the distribution of the third intersection control information, and it is necessary for the intersection 1 to be cleared of the vehicles 2. This is because if the third intersection control information is distributed while the vehicle 2 is passing from the west to the east inside the intersection 1 during the period when the first intersection control information is being provided for control, the vehicle 2 may collide with another vehicle 2 entering the intersection 1 from the north and turning left. That is, if any of the plurality of travel tracks permitted by the first intersection control information and any of the plurality of travel tracks permitted by the third intersection control information interfere with each other, a clearance interval period is required to prohibit any of the vehicles 2 from entering the intersection 1.

On the other hand, as shown in FIG. 13, if the second intersection control information is distributed between the distribution of the first intersection control information and the distribution of the third intersection control information, the vehicle 2 is permitted to travel on the travel tracks that are common among the plurality of travel tracks permitted by the first intersection control information and the plurality of travel tracks permitted by the third intersection control information, and the vehicle 2 is prohibited from traveling on the other travel tracks. Therefore, among the plurality of travel tracks permitted by the first intersection control information, the vehicles 2 are cleared from a travel track A that interferes with the plurality of travel tracks permitted by the third intersection control information, so that a collision between the vehicles 2 in the intersection 1 can be prevented while a traffic volume at the intersection 1 can be increased.

Although the preferred embodiment of the present disclosure has been described above, the above embodiment has the following features.

That is, the intersection control apparatus 3 (intersection control system) for controlling entries of the vehicles 2 into the intersection 1 includes the decision unit 21 configured to decide first intersection control information, second intersection control information, and third intersection control information and the distribution unit 22 configured to distribute the first intersection control information, the second intersection control information, and the third intersection control information to the plurality of vehicles 2 scheduled to pass through the intersection 1 in the recited order. The first intersection control information and the third intersection control information include a plurality of permitted track information pieces. The second intersection control information includes at least one permitted track information piece. As shown in FIG. 13, the first intersection control information, the second intersection control information, and the third intersection control information are different from each other. Each of the permitted track information pieces indicates a permitted travel track of the vehicles 2 when the vehicles 2 pass through the intersection 1. Furthermore, as shown in FIG. 13, the first intersection control information and the third intersection control information include the at least one permitted track information piece included in the second intersection control information. According to the above configuration, a traffic volume at intersection 1 can be increased without increasing the risk that a collision may occur between the vehicles 2 at the intersection 1.

The decision unit 21 acquires travel track information indicating travel tracks of the plurality of vehicles 2 scheduled to pass through the intersection 1 when the vehicles 2 pass through the intersection 1 (S100, S140) and then decides the first intersection control information and the third intersection control information based on the travel track information about the plurality of vehicles 2 (S110, S150). The decision unit 21 decides the second intersection control information based on the first intersection control information and the third intersection control information (S170). According to the above configuration, the first intersection control information, the second intersection control information, and the third intersection control information can be reasonably decided.

The intersection control apparatus 3 further includes a storage unit 20 configured to store a plurality of intersection control information pieces different from each other. The decision unit 21 decides the first intersection control information and the third intersection control information by selecting the first intersection control information and the third intersection control information from the plurality of intersection control information pieces stored in the storage unit 20 based on the travel track information about the plurality of vehicles 2. According to the above configuration, the first and third intersection control information can be decided at a lower calculation cost compared with the case where the first and third intersection control information is generated each time.

Moreover, for example, as shown in FIG. 14, when each of the intersection control information pieces is composed of a bit array, the bit array including a bit corresponding to the permitted travel track as a first value and a bit corresponding to another travel track as a second value different from the first value, the decision unit 21 generates the bit array of the second intersection control information by performing a bitwise operation on the bit array of the first intersection control information and the bit array of the third intersection control information. According to the above configuration, the second intersection control information can be obtained at a low calculation cost.

The second intersection control information may also include the plurality of permitted track information pieces. In this case, the first intersection control information and the third intersection control information include all of the plurality of permitted track information pieces included in the second intersection control information. Alternatively, the first intersection control information and the third intersection control information may include only one of the plurality of permitted track information pieces included in the second intersection control information. In either case, a traffic volume at the intersection 1 can be increased without increasing the risk that a collision may occur between the vehicles 2 at the intersection 1.

In addition, the travel tracks of the plurality of permitted track information pieces of the first intersection control information do not interfere with each other. The travel tracks of the plurality of permitted track information pieces of the third intersection control information do not interfere with each other. According to the above configuration, the collision of the vehicles 2 in the intersection 1 can be avoided under the control using the first intersection control information. The same is true under the control using the third intersection control information.

A first period and a third period are longer than a second period. The first intersection control information is provided for control at the intersection in the first period, the third intersection control information is provided for control at the intersection in the third period, and the second intersection control information is provided for control at the intersection in the second period. The first and third periods are typically 2 minutes, but they are not limited thereto. The first and third periods are, as an example, arbitrarily set within the range of 30 seconds to 5 minutes. The first and third periods may be identical or different from each other. The second period is typically 5 seconds, but it is not limited thereto. The second period may be configured based on the time required to clear the intersection 1 of the vehicles 2 within it. The second period may be set arbitrarily within the range of, for example, 1 to 10 seconds.

As shown in FIG. 14, the intersection control method for controlling entry of the vehicles 2 to the intersection 1 includes a decision step (S110, S150, S170) for deciding the first intersection control information, the second intersection control information, and the third intersection control information, and a distribution step (S120, S180, S200) for distributing the first intersection control information, the second intersection control information, and the third intersection control information to the plurality of vehicles 2 scheduled to pass through the intersection 1 in the recited order. According to the above method, a traffic volume at intersection 1 can be increased without increasing the risk that a collision may occur between the vehicles 2 at the intersection 1.

The above embodiment can be modified as follows, for example.

That is, in the above embodiment, the decision unit 21 acquires the travel track information about each vehicle 2 based on the vehicle information received from the plurality of vehicles 2. Alternatively, the decision unit 21 may determine whether a blinker of each vehicle 2 in the vicinity of the intersection 1 flashes based on the captured image information output from the camera 23, and then generate the travel track information about each vehicle 2 based on the determination result.

In the above embodiment, the intersection 1 is defined as a four-way junction (crossroads). Alternatively, the intersection 1 may be a three-way junction or a five-way junction.

In addition, the current location information and route information about each vehicle 2 entering the intersection 1 may be input to create a control model by machine learning so that there is no collision between the vehicles 2 and the throughput is maximized.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. An intersection control system for controlling entries of vehicles into an intersection, the intersection control system comprising a central processing unit configured to:

acquire first vehicle information about a plurality of vehicles scheduled to pass through the intersection;

decide first intersection control information indicating permitted track information for the plurality of vehicles to pass through the intersection;

distribute the first intersection control information to the plurality of vehicles;

after a first predetermined time has elapsed, acquire third vehicle information about the plurality of vehicles;

decide third intersection control information indicating permitted track information for the plurality of vehicles to pass through the intersection;

determine whether the first intersection control information is different from the third intersection control information;

upon determination that the first intersection control information is different from the third intersection control information, decide second intersection control information based on the first intersection control information and the third intersection control information; and distribute the second intersection control information to the plurality of vehicles, thereby causing an autonomous vehicle of the plurality of vehicles to enter the intersection or wait before entering the intersection based on the second intersection control information.

2. The intersection control system according to claim 1, wherein the central processing unit is configured to:

acquire travel track information indicating travel tracks of the plurality of vehicles scheduled to pass through the intersection when the vehicles pass through the intersection, decide the first intersection control information and the third intersection control information based on the travel track information about the plurality of vehicles, and decide the second intersection control information based on the first intersection control information and the third intersection control information.

3. The intersection control system according to claim 2, wherein the central processing unit is further configured to:

store a plurality of intersection control information pieces different from each other, and decide the first intersection control information and the third intersection control information by selecting the first intersection control information and the third intersection control information from the plurality of intersection control information pieces based on the travel track information about the plurality of vehicles.

4. The intersection control system according to claim 3, wherein when each of the intersection control information pieces is composed of a bit array, the bit array including a bit corresponding to the permitted travel track as a first value and a bit corresponding to another travel track as a second value different from the first value, the central processing unit generates the bit array of the second intersection control information by performing a bitwise operation on the bit array of the first intersection control information and the bit array of the third intersection control information.

5. The intersection control system according to claim 1, wherein the at least one permitted track information piece of the second intersection control information includes a plurality of the permitted track information pieces, and the first intersection control information and the third intersection control information include all of the plurality of permitted track information pieces included in the second intersection control information.

6. The intersection control system according to claim 1, wherein the travel tracks of the plurality of permitted track information pieces of the first intersection control information do not interfere with each other, and the travel tracks of the plurality of permitted track information pieces of the third intersection control information do not interfere with each other.

7. The intersection control system according to claim 1, wherein a first period and a third period are longer than a second period, the first intersection control information being provided for control at the intersection in the first period, the third intersection control information being provided for control at the intersection in the third period, and the second intersection control information being provided for control at the intersection in the second period.

8. An intersection control method for controlling entries of vehicles into an intersection, the intersection control method comprising:

acquiring first vehicle information about a plurality of vehicles scheduled to pass through the intersection;

deciding first intersection control information indicating permitted track information for the plurality of vehicles to pass through the intersection;

distributing the first intersection control information to the plurality of vehicles;

after a first predetermined time has elapsed, acquiring third vehicle information about the plurality of vehicles;

deciding third intersection control information indicating permitted track information for the plurality of vehicles to pass through the intersection;

determining whether the first intersection control information is different from the third intersection control information;

upon determination that the first intersection control information is different from the third intersection control information, deciding second intersection control information based on the first intersection control information and the third intersection control information; and distributing the second intersection control information to the plurality of vehicles, thereby causing an autonomous vehicle of the plurality of vehicles to enter the intersection or wait before entering the intersection based on the second intersection control information.

9. A non-transitory computer readable medium storing a control program, the control program causing a computer to execute the steps of:

acquiring first vehicle information about a plurality of vehicles scheduled to pass through an intersection;

deciding first intersection control information indicating permitted track information for the plurality of vehicles to pass through the intersection;

distributing the first intersection control information to the plurality of vehicles;

after a first predetermined time has elapsed, acquiring third vehicle information about the plurality of vehicles;

deciding third intersection control information indicating permitted track information for the plurality of vehicles to pass through the intersection;

determining whether the first intersection control information is different from the third intersection control information;

upon determination that the first intersection control information is different from the third intersection control information, deciding second intersection control information based on the first intersection control information and the third intersection control information; and distributing the second intersection control information to the plurality of vehicles, thereby causing an autonomous vehicle of the plurality of vehicles to enter the intersection or wait before entering the intersection based on the second intersection control information.

* * * * *